(No Model.)
S. M. JONES.
COUPLING FOR HOLLOW RODS OR PIPES.
No. 528,167. Patented Oct. 30, 1894.
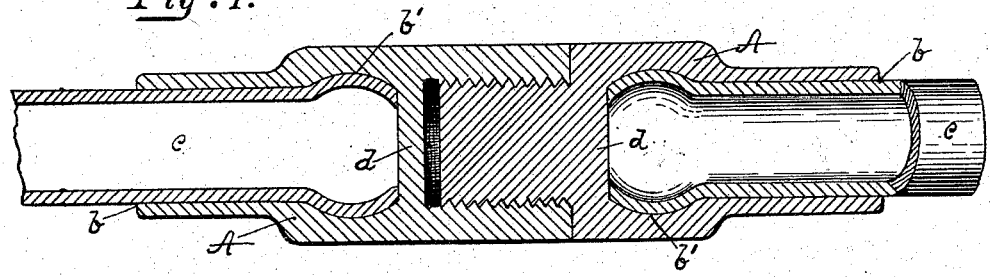
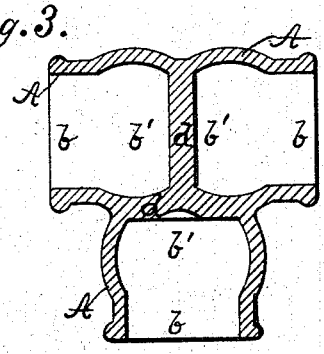
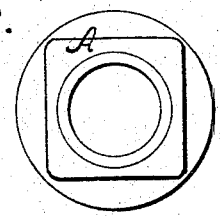
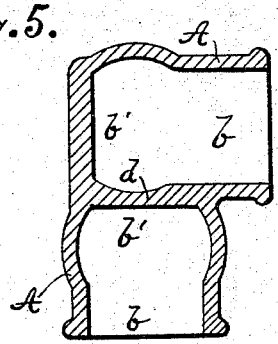
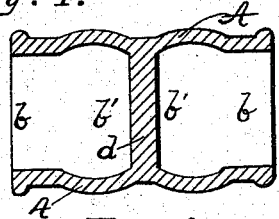
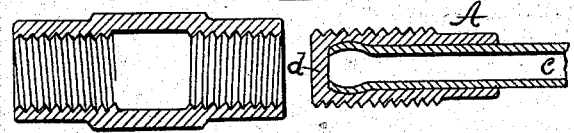
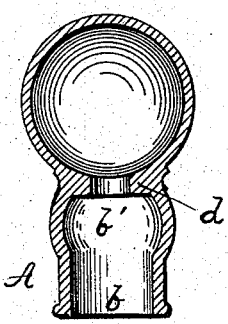
Witnesses.
David C. Walter
H. H. Waite.
Inventor.
Samuel M. Jones

UNITED STATES PATENT OFFICE.

SAMUEL M. JONES, OF TOLEDO, OHIO.

COUPLING FOR HOLLOW RODS OR PIPES.

SPECIFICATION forming part of Letters Patent No. 528,167, dated October 30, 1894.

Application filed May 7, 1894. Serial No. 510,263. (No model.)

*To all whom it may concern:*

Be it known that I, SAMUEL M. JONES, a citizen of the United States, residing at Toledo, Lucas county, Ohio, have invented certain new and useful Improvements in Joints or Couplings for Hollow Rods or Pipes and the Art or Method of Forming Such Joints, of which the following is a specification.

My invention relates to and its object is to provide a cheap, simple and effective method of attaching the ends of pipes together, either in a right line or at an angle to each other, and I attain this object by means of the devices hereinafter described and shown in the accompanying drawings, made part hereof, which illustrate various applications of my invention, and in which—

Figure 1, is a longitudinal, central, sectional view of two pipes united, according to my method, with sleeves, the sleeves being screwed together; Fig. 2, an end view of the same; Fig. 3, a T coupling; Fig. 4, an end to end coupling; Fig. 5, an L coupling; Fig. 6, my device as applied to a turn-buckle; Fig. 7, a step or cap, and Fig. 8, an ornamental top for a tubular post.

Like letters of reference indicate like parts throughout the several views.

In the drawings A is a sleeve or casing, usually of cast metal, having one or more cylindrical parts in which is a bore, $b$, suited to the pipe to be received. The bore $b$, at its inner end, is enlarged to form a chamber, $b'$. The inner end of chamber $b'$ is either wholly closed, as in Figs. 1 to 7, or contracted to a smaller area than the pipe to be introduced and attached, as in Fig. 8. The pipe $c$ is inserted into bore $b$ so that the end of the pipe abuts against the inner wall $d$, of chamber $b'$, and the end of the pipe is expanded to completely fill the chamber, thus forming a close union between the parts and preventing the withdrawal of the pipe.

The expansion of the pipe within the chamber is accomplished as follows: The sleeve or casing A and the end of the pipe or tube $c$ are first heated and the pipe-end is inserted into the bore $b$ so that the pipe rests against the shoulder or wall $d$. A heavy pressure is now applied to the pipe and sleeve oppositely in the direction of the length of the pipe, which upsets the heated end of the pipe causing it to bulge and expand and to fill chamber $b'$, as seen in Figs. 1 and 6. The cooling of the sleeve shrinks it upon the expanded pipe, forming a very close and strong union of the parts.

In practice, when it is not convenient to apply pressure to the heated parts, as above described, the same results may be attained by heavy blows with hammer or sledge upon the outer end of the pipe or sleeve, or both.

What I claim as my invention, and desire to secure by Letters Patent, is—

1. A joint or coupling for pipes or hollow rods, comprising a sleeve having its bore contracted or closed at its inner end and chambered or enlarged adjacent to its inner end, in combination with a pipe in said sleeve having an expanded portion near its inner end and filling the chambered portion of said sleeve, substantially as shown and described, for the purpose specified.

2. The art or method of coupling a pipe with a body having a bore contracted or closed at its inner end and chambered or enlarged adjacent to its inner end, which consists in placing the end of the pipe in and against the contracted or closed end of said bore, and by compression or concussion upsetting or expanding said pipe within the chambered portion of said sleeve, substantially as shown and described, for the purpose specified.

SAMUEL M. JONES.

Witnesses:
ISAAC N. HUNTSBERGER,
L. E. BROWN.